(12) United States Patent
Wielenga et al.

(10) Patent No.: US 9,476,173 B1
(45) Date of Patent: Oct. 25, 2016

(54) QUICK RELEASE MECHANISM FOR A SIGN DISPLAY STAND

(71) Applicant: TrafFix Devices, Inc., San Clemente, CA (US)

(72) Inventors: Bob Wielenga, Laguna Hills, CA (US); Felipe Almanza, Perris, CA (US); Geoffrey Maus, Mission Viejo, CA (US); Jeremy Smith, San Clemente, CA (US); Guadalupe Garcia, Tijuana (MX); Kevin Gasperini, San Clemente, CA (US)

(73) Assignee: TrafFix Devices, Inc., San Clemente, CA (US)

( * ) Notice: Subject to any disclaimer, the term of this patent is extended or adjusted under 35 U.S.C. 154(b) by 0 days.

(21) Appl. No.: 13/764,651

(22) Filed: Feb. 11, 2013

Related U.S. Application Data

(60) Provisional application No. 61/597,349, filed on Feb. 10, 2012.

(51) Int. Cl.

| | |
|---|---|
| *F16M 11/38* | (2006.01) |
| *F16M 11/34* | (2006.01) |
| *E01F 9/012* | (2006.01) |
| *F16M 11/20* | (2006.01) |
| *F16M 11/24* | (2006.01) |
| *G09F 15/00* | (2006.01) |

(Continued)

(52) U.S. Cl.
CPC .............. *E01F 9/012* (2013.01); *F16M 11/20* (2013.01); *F16M 11/245* (2013.01); *F16M 11/34* (2013.01); *F16M 11/242* (2013.01); *G09F 15/0056* (2013.01); *G09F 15/0062* (2013.01); *G09F 15/0068* (2013.01)

(58) Field of Classification Search
CPC ...... G09F 1/06; G09F 15/00; G09F 15/0025; G09F 15/0056; G09F 15/0062; G09F 15/0068; G09F 17/00; G09F 1/10; G09F 1/12; G09F 15/0018; G09F 7/18; G10G 5/00; A47B 2003/025; A47B 3/02; F16M 11/38; F16M 11/242; F16M 11/16; F16M 11/32; F16M 11/34; F16M 11/245
USPC ............ 248/188.7, 170, 171, 168, 169, 436, 248/439, 165, 166; 40/610, 612, 607.1
See application file for complete search history.

(56) References Cited

U.S. PATENT DOCUMENTS

| | | | | |
|---|---|---|---|---|
| 1,008,545 | A | * | 11/1911 | Humphrey .................... 248/171 |
| 1,480,788 | A | * | 1/1924 | Sordillo ........................ 248/462 |

(Continued)

*Primary Examiner* — Syed A Islam
*Assistant Examiner* — Taylor Morris
(74) *Attorney, Agent, or Firm* — Stout, Uxa & Buyan, LLP; Donald E. Stout

(57) ABSTRACT

A support stand includes a base, a plurality of legs pivotally attached to the base, a post extending from the base in an upright orientation, and a slider disposed on the post and slidable upwardly and downwardly thereon. The plurality of legs are each connected to the slider so that all of the legs are movable simultaneously to deploy or stow the stand. To deploy, the support stand is placed in a desired location, and the slider is released from a fixed position relative to the post, thereby allowing the slider and the connected plurality of legs to each fall simultaneously to a lower end of the support stand. With the downward movement of the slider, the plurality of legs also pivot to an extended position, with outer ends of each leg disposed on a ground surface to support the support stand. Then, the slider is fixed to the post at a lower end thereof to ensure that the plurality of legs remain in their extended position.

10 Claims, 9 Drawing Sheets

(51) Int. Cl.
  *G09F 15/02* (2006.01)
  *G09F 7/00* (2006.01)

(56) References Cited

U.S. PATENT DOCUMENTS

| | | | | |
|---|---|---|---|---|
| 4,381,690 A | * | 5/1983 | Kimble | 84/422.3 |
| 5,137,236 A | * | 8/1992 | Burns | 248/171 |
| 5,290,030 A | * | 3/1994 | Medbury | 473/47 |
| 5,454,810 A | * | 10/1995 | Pohl et al. | 606/59 |
| 5,611,509 A | | 3/1997 | Kulp et al. | |
| 5,829,178 A | * | 11/1998 | Hillstrom | 40/610 |
| 6,755,381 B1 | * | 6/2004 | Levin et al. | 248/163.1 |
| 7,478,496 B2 | * | 1/2009 | Bender | 42/94 |

\* cited by examiner

QUICK RELEASE MECHANISM FOR A SIGN DISPLAY STAND

This application claims the benefit under 35 U.S.C. 119(e) of the filing date of Provisional U.S. Application Ser. No. 61/597,349, entitled Quick Release Mechanism for a Sign Display Stand, filed on Feb. 10, 2012, which application is expressly incorporated herein by reference, in its entirety.

BACKGROUND OF THE INVENTION

This invention relates to a quick release mechanism for use on foldable legs attached to supporting structures for signs, barriers, and the like.

Portable stands, for example, for use in temporarily supporting an outdoor sign for conveying a message to passing motorists are well known in the art. It is known to be advantageous for such support stands to be readily assembled and disassembled with very little effort on the part of the worker responsible for erecting and taking down the sign. Often, such support stands comprise a base from which the mast to which the sign is attached extends upwardly. A plurality of legs, usually four, are pivotally attached to the base. The legs are each designed to pivot from a folded, upright position for compact storage and easy transportability to an extended deployed position for supporting the sign. In both the folded and the extended positions each leg is fixedly attached to the base to prevent undesired pivoting. One such very successful portable sign stand, having a quick release mechanism for releasing one leg at a time, for deploying the sign stand, is disclosed in commonly assigned U.S. Pat. No. 5,611,509, herein expressly incorporated by reference, in its entirety.

It would be desirable, however, to have incorporated into such a sign stand a quick-release mechanism which would simultaneously deploy all four sign stand support legs, for immediate deployment of the sign stand with a minimum of labor. Such a mechanism would also expedite the folding and stowing of such a sign stand when the job is done.

SUMMARY OF THE INVENTION

This invention solves the problems described above by providing a sign stand having a quick release mechanism which is simple, easy to operate, and permits the simultaneous release of all of the legs from the stand base.

More particularly, there is provided a support stand which comprises a base, a plurality of legs, preferably four, pivotally attached to the base, a post extending from the base in an upright orientation, and a slider disposed on the post and slidable upwardly and downwardly thereon. Advantageously, the plurality of legs are each connected to the slider so that all of the plurality of legs are movable simultaneously to deploy or stow the stand. The post includes an aperture at an upper end thereof for receiving a sign mast. In some embodiments, the base comprises at least one spring for assisting a sign mounted on the post in remaining upright during high wind conditions.

When the support stand is in its compact, stowed orientation, the plurality of legs are substantially upright, generally parallel and adjacent to the post, with the slider fixedly disposed at an upper location on the post. When the support stand is in an extended deployed orientation, the plurality of legs extend outwardly away from the post, with distal ends thereof resting on a ground surface and the slider disposed at a lower location on the post.

The base comprises a center portion having a receptacle for receiving a lower end of the post, and a plurality of plates extending outwardly from the center portion thereof, wherein the plurality of plates comprise structure for pivotally securing one end of each of the plurality of legs to the base. The slider comprises a center aperture for being slidably received on the post. In preferred embodiments, an insert lines the walls defining the center aperture for minimizing wear and facilitating sliding of the slider on the post. This insert is preferably made of plastic, and more preferably made of DELRIN® material, or the like.

The slider further comprises a plurality of plates extending outwardly from the center aperture of the slider. An outer end of each of the plates include structure for securing the plate outer end to a corresponding one of the plurality of legs. A slot is disposed on a surface of each of the plurality of legs which faces the slider. The slot is configured for attachment to the structure for securing the plate outer end to a corresponding one of the plurality of legs, so that the structure can slide within the slot lengthwise from one end of the slot to an opposed end of the slot, thereby allowing the legs to pivot relative to the slider. The structure disposed on an outer end of each of the plates comprises a linkage pivotally attached on one end to a pair of the plates and secured at an opposed end within the slot of one of the plurality of legs.

A plurality of openings are spaced along a height of the post and a pin is provided for securing the slider to one of the plurality of openings to thereby fix the slider at a desired position on the post.

In another aspect of the invention, there is disclosed a method of deploying and undeploying a support stand for signs and the like. The support stand comprises a base, a plurality of legs pivotally attached to the base, a post extending from the base in an upright orientation, and a slider disposed on the post and slidable upwardly and downwardly thereon, wherein the plurality of legs are each connected to the slider so that all of the plurality of legs are movable simultaneously to deploy or stow the stand. The method comprises placing the support stand in a desired location, and releasing the slider from a fixed position relative to the post, thereby allowing the slider and the connected plurality of legs to each fall simultaneously to a lower end of the support stand. With the downward movement of the slider, the plurality of legs also pivot to an extended position, with outer ends of each leg disposed on a ground surface to support the support stand. Then, the slider is fixed to the post at a lower end thereof to ensure that the plurality of legs remain in their extended position.

The releasing step comprises removing a pin from a first upper opening in the post, thereby disconnecting the slider from the post so that it is free to slide along the post. The fixing step comprises inserting the pin into a second lower opening in the post, to re-connect the slider to the post for preventing further sliding of the slider along the post. When it is desired to store or transport the support stand, the method includes a step of releasing the slider from the post at the lower end thereof, after which one of the plurality of legs is lifted to move the slider upwardly along the post. When the slider has been moved upwardly sufficiently to move the plurality of legs to a vertical stowed position adjacent to the post, the slider is fixed to the post at an upper location on the post, at which time the support stand is ready for transport or storage.

The invention, together with additional features and advantages thereof, may best be understood by reference to the following description taken in conjunction with the accompanying illustrative drawing.

DESCRIPTION OF THE PREFERRED EMBODIMENT

Figure 1:
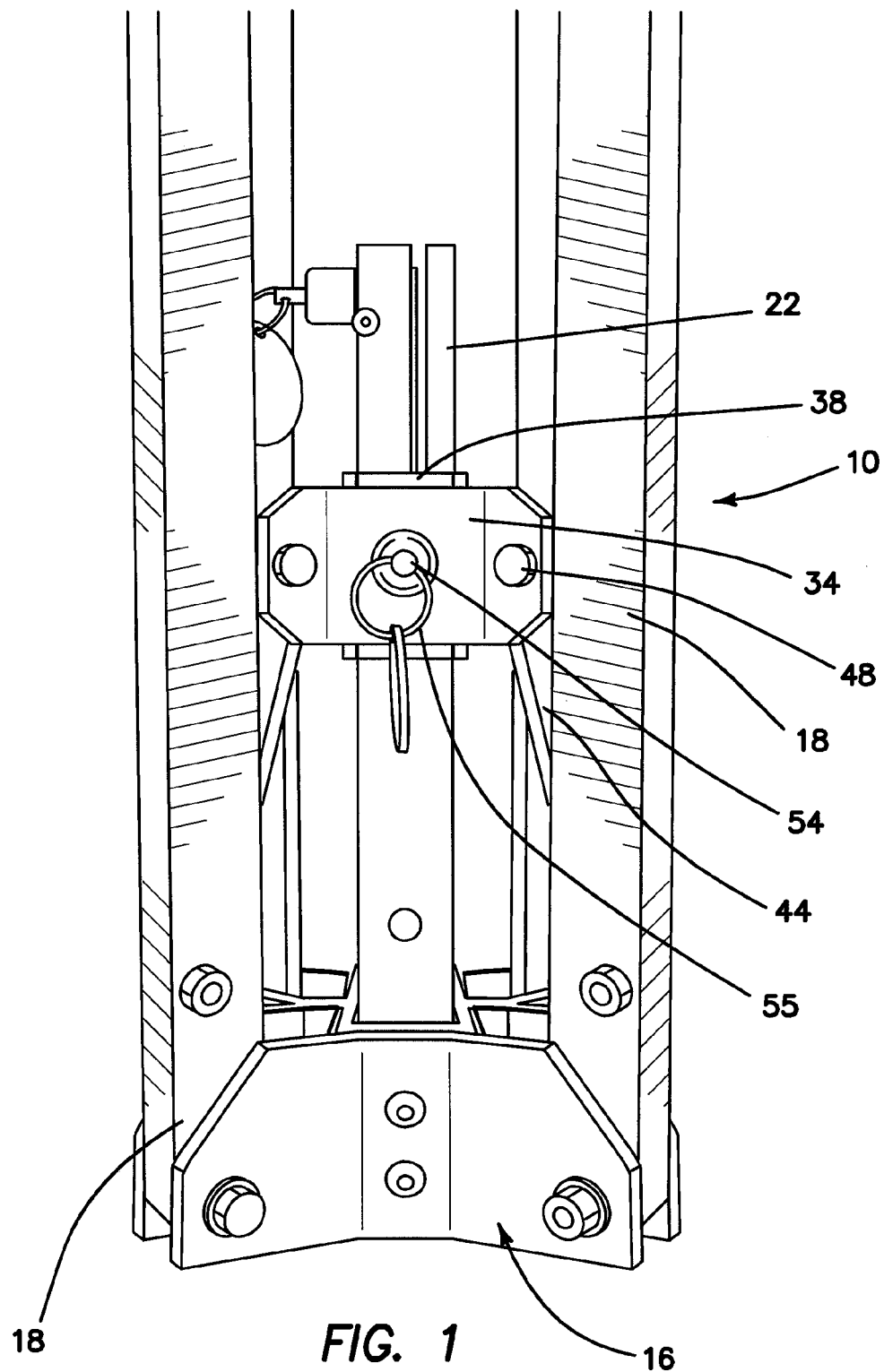
FIG. 1 is a view of a portion of the sign stand of the present invention, with its legs in a folded undeployed orientation.
Figure 2:
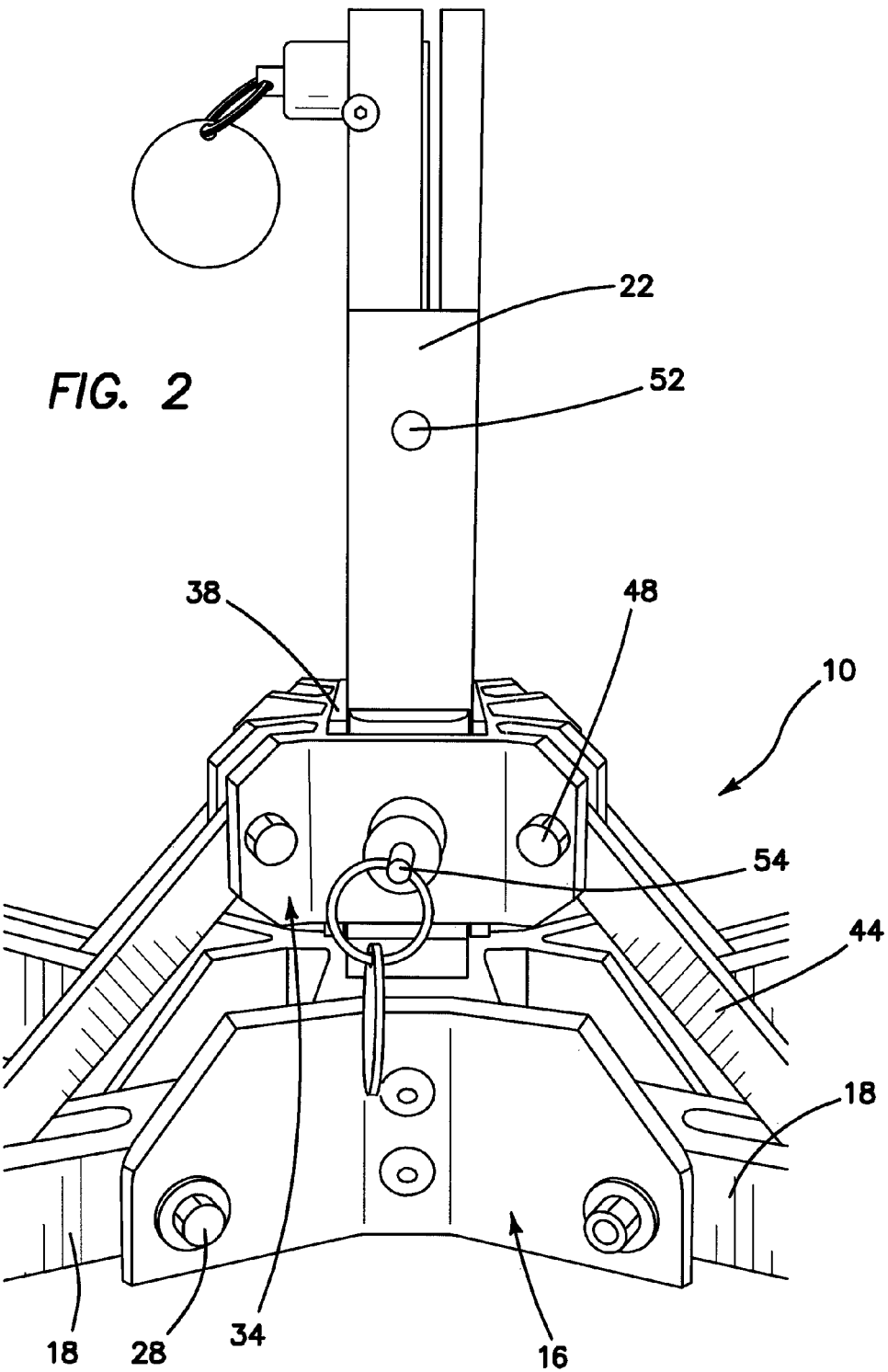
FIG. 2 is a view similar to FIG. 1, wherein the sign stand is in a deployed configuration.
Figure 10:
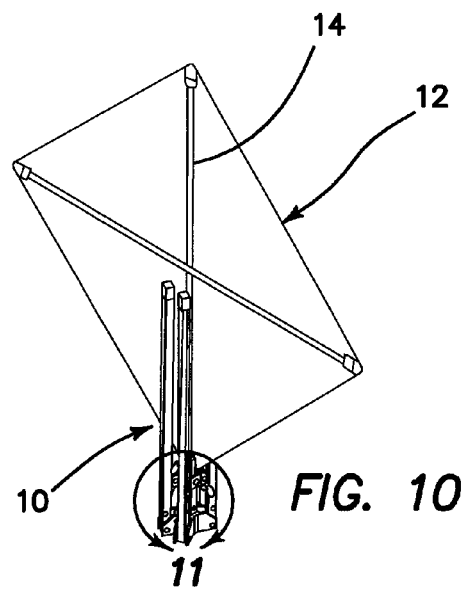
FIG. 10 is an isometric view of the sign stand of the present invention, in a stored, folded configuration.
Figure 11:
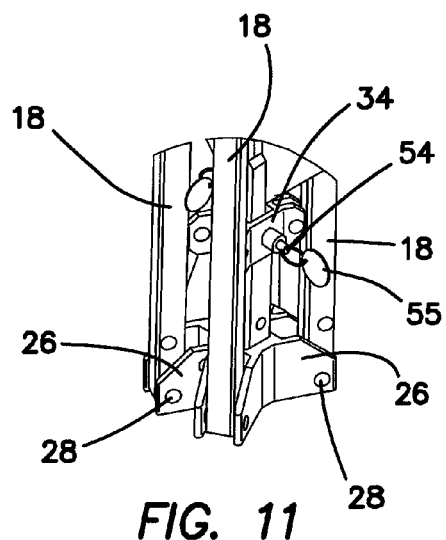
FIG. 11 is a detail view of the portion of FIG. 10 designated by the letter A.
Figure 12:
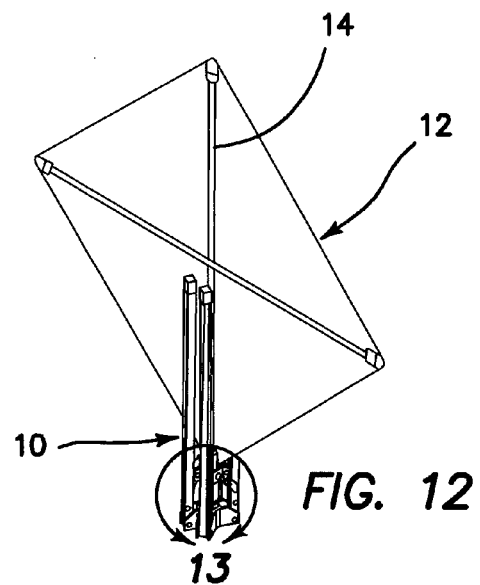
FIG. 12 is an isometric view of the sign stand of FIG. 10, wherein the lock has been released.
Figure 13:
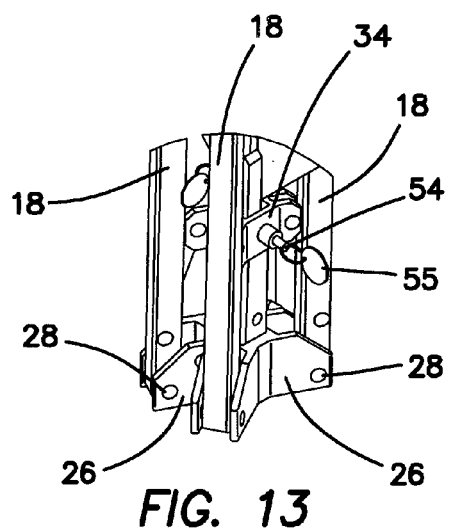
FIG. 13 is a detail view of the portion of FIG. 12 designated by the letter B.

Referring now more specifically to the drawings, in FIGS. 1 and 2 is illustrated a stand 10 for supporting a sign 12 (FIG. 10) to display messages to passing motorists, or for any other desired purposes. It is within the scope of the invention that the stand may be used to support structures other than signs, if desired. But a sign embodiment is illustrated for purposes of explanation of the inventive principles.

The sign 12 may be mounted on a mast 14, which at its lower end is attached to a base 16, forming a part of the inventive sign stand 10. Also attached to the base 16 are a plurality of legs 18, preferably four, which may be folded into an upright, compact storage position for transportation and storage of the sign stand (FIG. 1), or may be pivoted to an extended deployed position to support the stand (FIG. 2).

Figure 3:
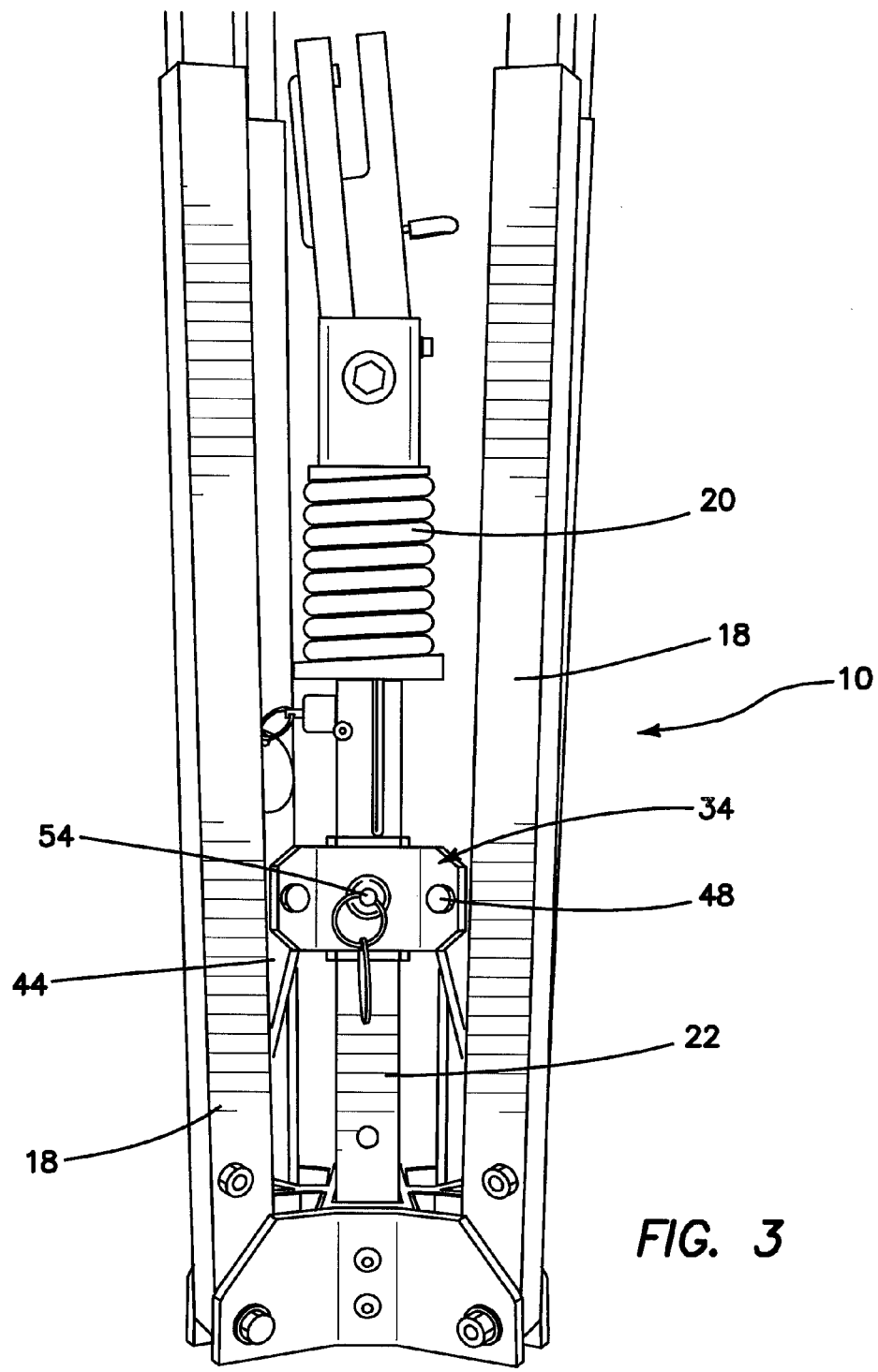
FIG. 3 is a view similar to FIGS. 1 and 2, showing the invention employed on a single-spring sign stand.
Figure 4:
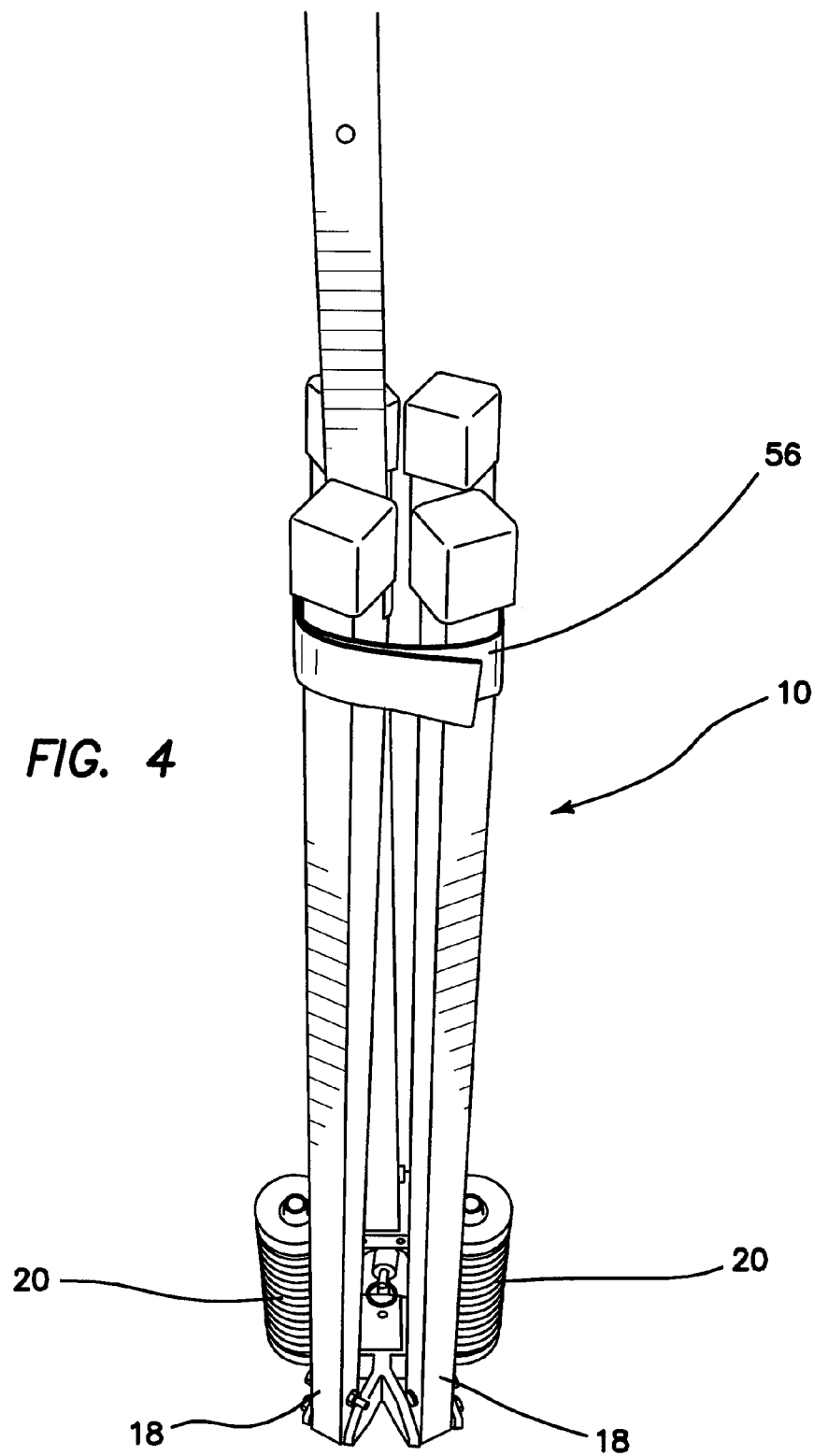
FIG. 4 is a view similar to FIGS. 1-3, showing the invention employed on a dual-spring sign stand.
Figure 5:
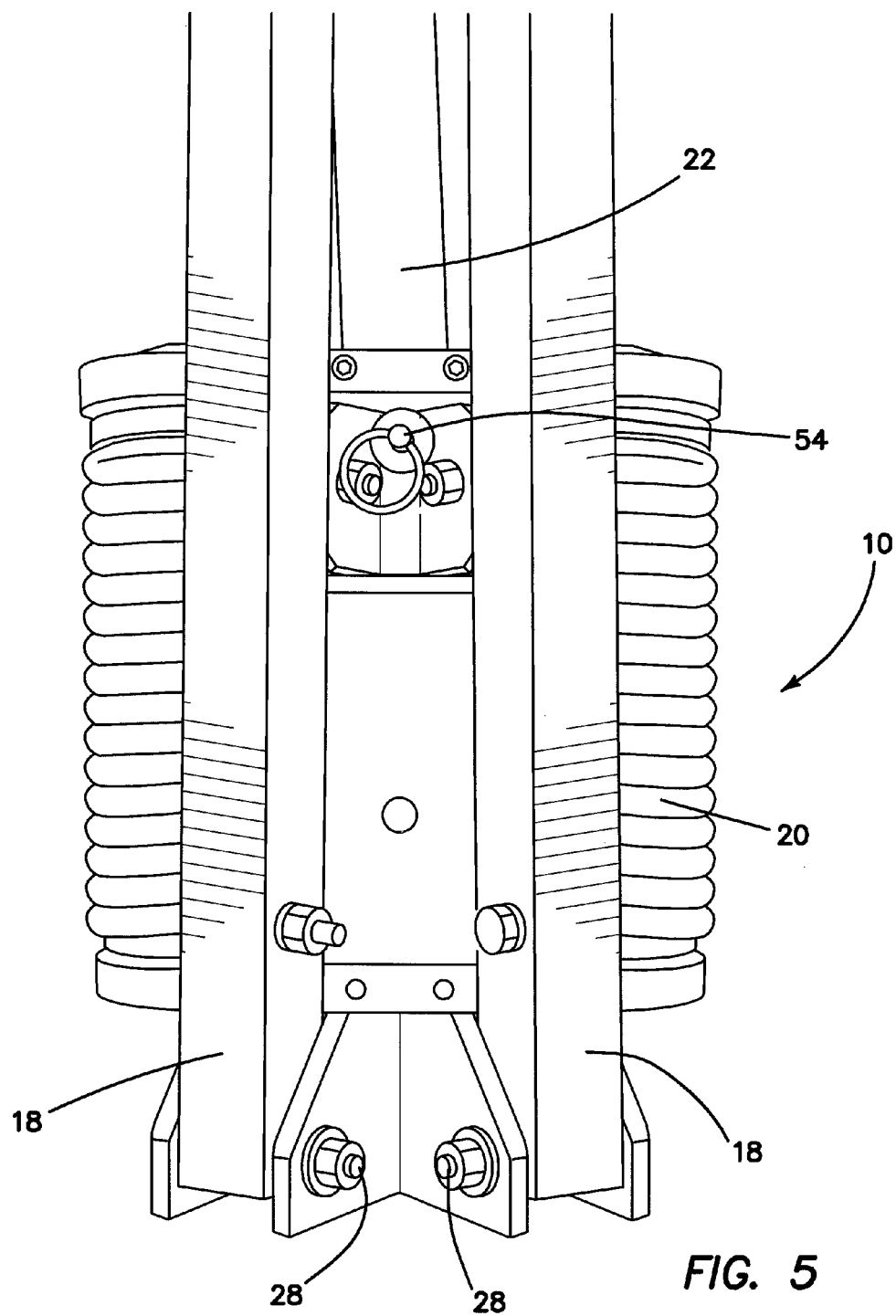
FIG. 5 is a view similar to FIGS. 1 and 3, showing the dual-spring sign stand in an undeployed configuration.

Typically, the base may include yieldable members such as springs 20 for ensuring that the sign will deflect in high wind conditions and return to an upright position, though such a feature is not required for the invention, and many other types of bases and sign attachments may be utilized. FIG. 3 illustrates a single-spring sign stand embodiment, while FIGS. 4 and 5 illustrate a dual-spring sign stand embodiment.

Figure 6:
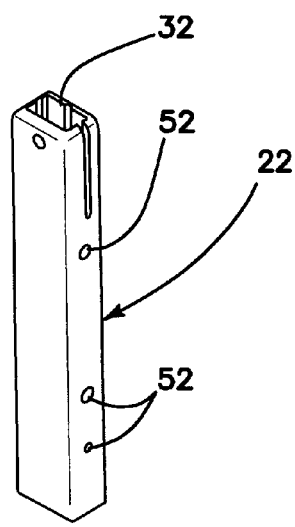
FIG. 6 is an isometric view of a sign stand post constructed in accordance with the principles of the present invention.
Figure 7:
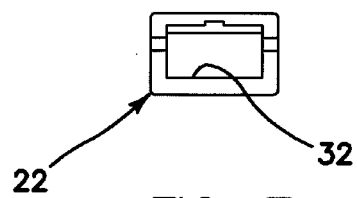
FIG. 7 is a top view of the post shown in FIG. 6.
Figure 8:
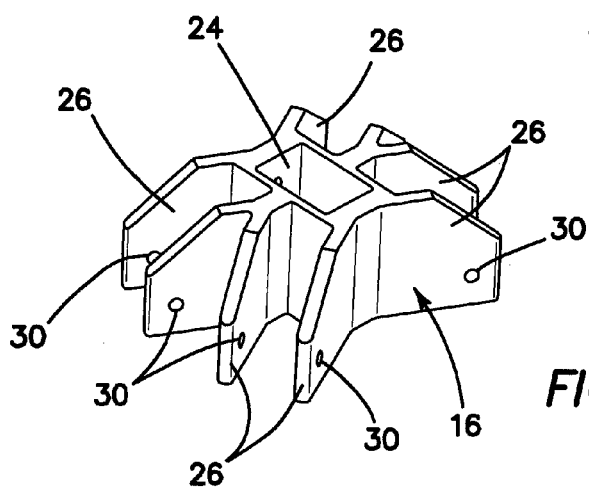
FIG. 8 is an isometric view of a sign stand base constructed in accordance with the principles of the present invention.

Now with further reference particularly to FIGS. 1-3, the sign stand and the inventive quick release mechanism for releasing the legs 18 from their upright stowed position to their extended deployed position will be more particularly described. As shown in FIG. 1, the sign stand 10 further comprises an upright post 22, which extends upwardly from the base 16, and is shown in greater detail in FIGS. 6 and 7. FIG. 8 illustrates the base 16 in isolation. As shown therein, the base 16 comprises a center portion having a receptacle 24 for receiving a lower end of the post 22. The base 16 and post 22 are both preferably formed of aluminum, using known fabrication methods, such as casting, though alternative suitable materials and fabrication methods, such as machining or assembly, may be used within the scope of the present invention. The base 16 comprises a plurality of plates 26 extending from the center portion thereof, as shown in FIG. 8. These plates have a function of attaching the base 16 to the legs 18. As shown in FIG. 8, the plates are integral to the center portion of the base 16 and with one another, being cast of one piece, but could alternatively be mechanically fastened together, as shown in FIG. 1, or welded, if desired. As can be seen by review of FIG. 8, as well as FIGS. 1, 5, 11, 13, 15, 17, and 19, the four legs 18 are insertable between adjacent ones of the plates 26, and pivotally attached to the base by means of a bolt and nut combination 28 secured at its opposing ends to the base via apertures 30 on the plates 26.

An upper end of the post 22 comprises an aperture 32 (FIGS. 6 and 7) for receiving a lower end of the sign mast 14. A slider 34 (FIGS. 1-3 and 9) includes a center aperture 36 through which the post 22 extends, so that the slider 34 is slidably disposed on the post 22. A plastic insert, or shim 38 (FIG. 1) lines the interior walls of the center aperture 36, to assist the sliding function and minimize wear. Preferably, this plastic insert may be fabricated of Polyoxymethylene (POM), sold by DuPont under the trademark DELRIN, but other suitable materials may be used instead.

Figure 9:
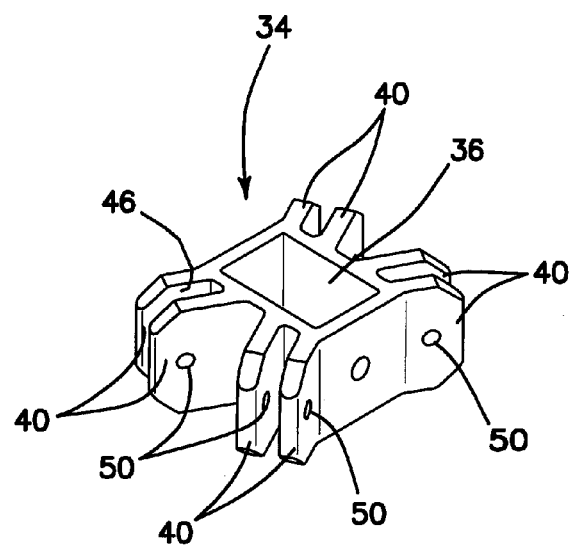
FIG. 9 is an isometric view of a top bracket constructed in accordance with the principles of the present invention.
Figure 15:
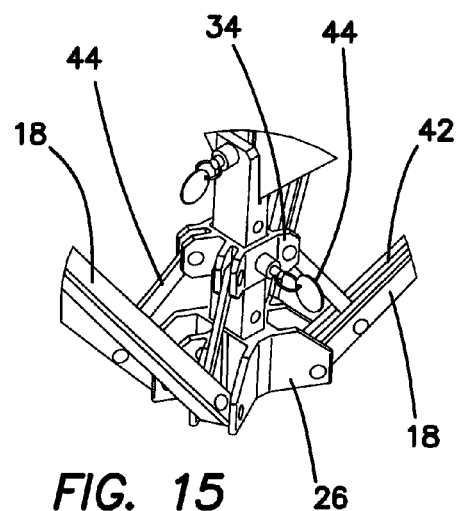
FIG. 15 is a detail view of the portion of FIG. 14 designated by the letter C.
Figure 17:
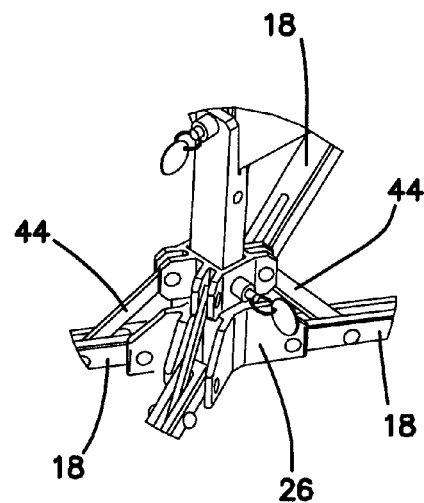
FIG. 17 is a detail view of the portion of FIG. 16 designated by the letter D.
Figure 18:
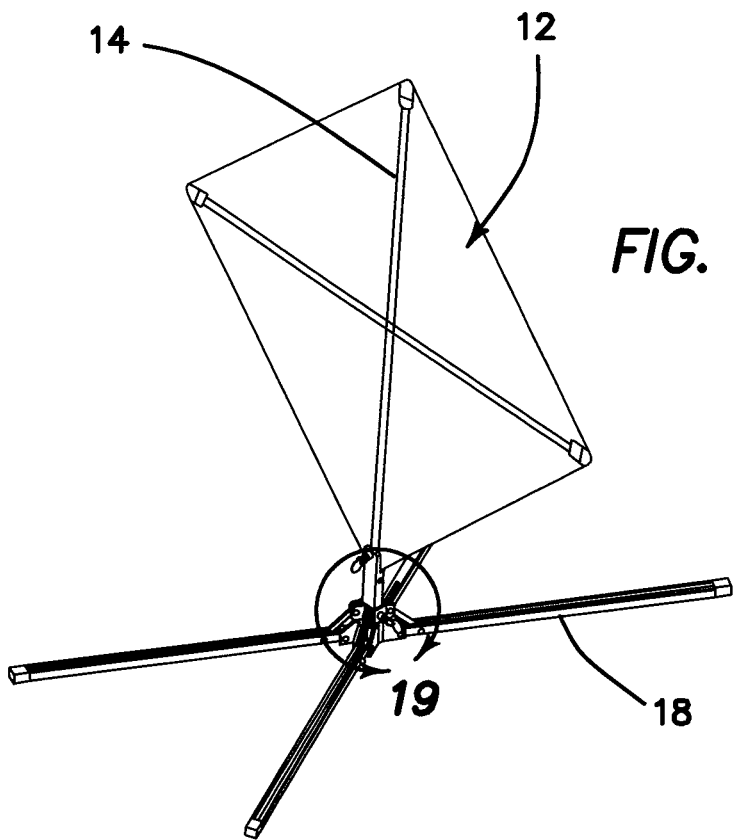
FIG. 18 is an isometric view of the sign stand of FIG. 10, wherein the sign stand has been lifted from the post to lock the stand in the deployed position.
Figure 19:
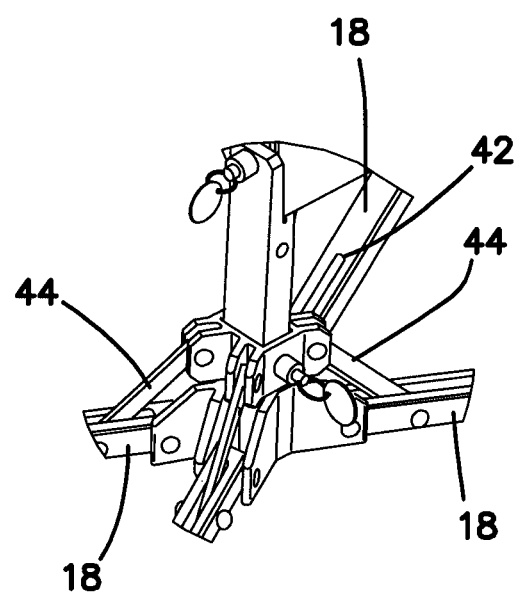
FIG. 19 is a detail view of the portion of FIG. 18 designated by the letter E.

Now referring more particularly to FIG. 9, which is a detailed view of the slider 34 without the plastic insert 38 in place in the aperture 36, it can be seen that the slider 34 is similar in construction to the base 16, except on a smaller scale, in that it comprises a plurality of plates 40, arranged in pairs. Referring particularly, as well, to FIGS. 15, 17, and 19, it can be seen that the interior face of each of the legs 18 includes a slot 42. The purpose of the slots 42 is to receive one end of a respective linkage 44 therein, so that the linkage can travel within the slot 42 lengthwise along the leg when the leg is pivoted between its compact and extended orientation. The other end of the linkage 44 is attached to the slider 34 in a manner similar to which the legs are attached to the base 16. Specifically, each linkage end is inserted between two adjacent corresponding plates 40, within a gap 46 (FIG. 9), and then pivotally secured to those plates 40 using a bolt and nut combination 48 secured within apertures 50.

Figure 16:
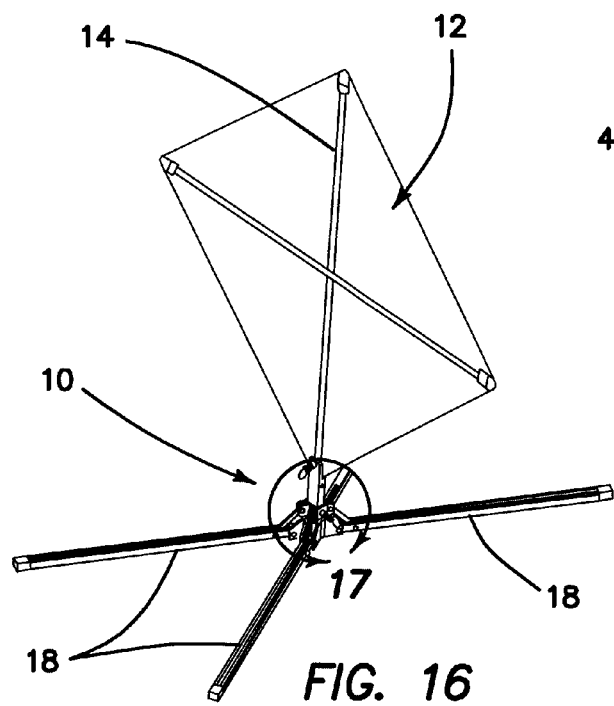
FIG. 16 is an isometric view of the sign stand of FIG. 10, wherein the legs have been deployed to a point to be level with the ground.

The post 22 comprises several spaced openings 52 (FIG. 6) extending through its sidewall for receiving a pin 54. The purpose of the pin 54, which may have a ring 55 attached to it (FIG. 1) for convenient pulling of the pin out of one of the openings 52, is to lock the legs 18 in a particular desired position relative to the remainder of the stand 10. When it is desired to lock the stand in its stored orientation, with the legs 18 fully upright, as shown in FIG. 1, then the pin 54 is inserted into the uppermost opening 52. On the other hand, when the stand is in its dully deployed orientation, with the legs 18 substantially flat on the ground and outwardly oriented, as shown for example in FIG. 16, then the pin 54 is inserted into the lowermost opening 52. In intermediate orientations, where it is desired to have the legs 18 deployed at an angle to the ground, intermediate openings 52 may be utilized.

In operation, a sign stand 10 will typically be in a stowed position, with the four legs 18 latched into an upright configuration, as illustrated in FIG. 1. Once the sign has been transported to the job site, where it is to be displayed, a worker may lift the sign stand from the truck and carry it to the desired display location, setting it down so that the base 16 rests on the ground or road surface. To assist in ensuring that the legs 18 remain in their stowed orientation, a strap 56 may be secured around them, as shown in FIG. 4. The strap 56 may use a suitable fastener, such as a snap or hook and loop (VELCRO) fastener.

Figure 14:
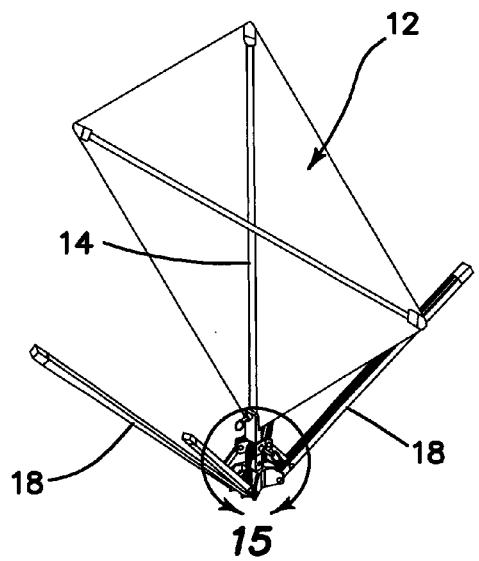
FIG. 14 is an isometric view of the sign stand of FIG. 10, wherein the legs have been pulled down to deploy the stand.

Then, to release the legs 18 from their upright stowed position, the worker simply unfastens the strap 56, if present, and removes the pin 54 from the uppermost opening 52 in the post 22. In some instances, such as for a quick-deploy embodiment, the upper pin connection may be dispensed with, and only the strap 56 used to secure the legs, so that unfastening the legs will begin the deployment process. Because all of the legs 18 are secured to the slider 34 via the linkages 44, when the strap 56 is unfastened and/or the pin 54 is removed, the slider 34 slides downwardly along the post 22, carrying the legs 18 with it. The legs 18 thus begin to deploy, as shown in FIGS. 14 and 15. When the legs 18 are fully deployed, the pin 54 is inserted into the lowermost opening 52 on the post 22. The legs are thus fixed in position to sturdily support the sign stand, even in adverse high wind conditions. If conditions warrant, and it is desired to raise the height of the sign or to compensate for uneven terrain, the pin 54 may instead be inserted into an intermediate opening 52, to secure the slider 34 at a higher level on the post 22.

To return the sign stand to the compact stowed position, as illustrated in FIG. 1, the pin 54 is removed from the lower opening 52 that it was inserted into to deploy the stand. Then, one of the legs 18 is lifted upwardly so that the leg again pivots about the bolt and nut combination 28. This action, in turn, pushes the slider 34 upwardly along the post 22. Since all of the legs 18 are attached to the slider, through the linkages 44, all of the legs 18 pivot upwardly to their stowed position simultaneously. When the legs are fully upright, the pin 54 is re-inserted into the uppermost opening 52 to secure the sign stand 10 in its stowed orientation. The strap 56 may be secured about the legs 18, if desired.

Accordingly, although an exemplary embodiment of the invention has been shown and described, it is to be understood that all of the terms used herein are descriptive rather than limiting, and that many changes, modifications, and substitutions may be made by one having ordinary skill in the art without departing from the spirit and scope of the invention. For example, as noted above, openings 52 can be placed anywhere between the stored and deployed pin openings to control the height of the sign stand. The post is manufactured in a way, to allow for a quick deploy (no stored pin opening at the top), and a standard deploy (with a pin opening at the top). The inventive system is useful for any poly-leg design—two or more legs, though four are shown. Being able to drop all of the legs at the same time, while never having to move from one side to the other of the stand, as well as never having to take one's eyes off of passing traffic, is highly advantageous.

What is claimed is:

1. A support stand comprising:
   a base having a lower surface adapted for resting on ground or a road surface;
   a plurality of legs pivotally attached to the base;
   a post extending from the base in an upright orientation;
   a slider disposed on the post and slidable upwardly and downwardly thereon;
   said plurality of legs each being connected to the slider by identical connecting structure so that all of the plurality of legs are movable simultaneously to deploy or stow the stand, the plurality of legs further being substantially upright, generally parallel and adjacent to the post, with the slider disposed at an upper location on the post, when the support stand is in a compact, stowed orientation, and further wherein the plurality of legs extend outwardly away from the post, with both proximal and distal ends thereof resting on a ground or road surface, together with the lower surface of the base, and the slider disposed at a lower location on the post, when the support stand is in an extended deployed orientation, each of the plurality of legs always being at an identical orientation to the post relative to each of remaining ones of the plurality of legs;
   each of said plurality of legs having an interior face, facing said slider, along which is disposed a slot; and
   a plurality of linkages, each having a first end pivotally attached to the slider and a second end slidably disposed in one of said slots, so that the second end of each linkage can travel within its corresponding slot lengthwise along the leg when the leg is pivoted between its compact and extended orientation;
   wherein when the support stand is in its compact, stowed orientation, and the plurality of legs extend upwardly adjacent to the post, the legs each have a length sufficient so that the distal ends of the legs are substantially higher than the slider;
   the base comprising a center portion having a receptacle for receiving a lower end of the post, and a plurality of plates extending outwardly from the center portion thereof, the plurality of plates comprising structure for pivotally securing one end of each of the plurality of legs to the base, the plurality of plates including a first pair of plates on opposed ends of the base which each extend from opposed sides of the base, and a second pair of opposed plates which extend from the opposed sides of the base, each of the plates of the second pair of plates comprising two angled plates, wherein one of the angled plates is parallel to one of the first pair of plates and the other of the angled plates is parallel to the other of the first pair of plates, so that each parallel combination of plates provide a receptacle for one of the legs.

2. The support stand as recited in claim 1, wherein the post includes an aperture at an upper end thereof for receiving a sign mast.

3. The support stand as recited in claim 2, wherein said base comprises at least one spring for assisting a sign mounted on the post in remaining upright during high wind conditions.

4. The support stand as recited in claim 1, wherein the plurality of legs comprises four legs.

5. The support stand as recited in claim 1, wherein the slider comprises a center aperture for being axially slidably received on the post.

6. The support stand as recited in claim 5, and further comprising an insert lining walls defining the center aperture for minimizing wear and facilitating sliding of the slider on the post.

7. The support stand as recited in claim 6, wherein said insert comprises plastic.

8. The support stand as recited in claim 7, wherein the insert comprises Polyoxymethylene.

9. The support stand as recited in claim 5, and further comprising a plurality of openings spaced along a height of the post and a pin for securing the slider to one of the plurality of openings to thereby fix the slider at a desired position on the post.

10. The support stand as recited in claim 1, wherein the slider comprises a center portion having a receptacle for receiving the post in axially sliding relation thereto, and a plurality of plates extending outwardly from the center portion thereof, the plurality of plates comprising structure for pivotally securing one end of each of the plurality of linkages to the center portion.

\* \* \* \* \*